US006983887B2

(12) United States Patent
Holland

(10) Patent No.: US 6,983,887 B2
(45) Date of Patent: Jan. 10, 2006

(54) PROMOTIONAL APPARATUS FOR CALCULATING CHARACTERISTICS OF SUBJECTS USING TWO INPUT VARIABLES

(75) Inventor: Jason S. Holland, Raleigh, NC (US)

(73) Assignee: Adstracts, Inc., Raleigh, NC (US)

( * ) Notice: Subject to any disclaimer, the term of this patent is extended or adjusted under 35 U.S.C. 154(b) by 0 days.

(21) Appl. No.: 10/837,772

(22) Filed: May 3, 2004

(65) Prior Publication Data

US 2005/0242166 A1 Nov. 3, 2005

(51) Int. Cl.
*G06K 13/00* (2006.01)

(52) U.S. Cl. ...................... 235/475; 235/61 R; 235/73; 235/74; 235/77; 235/78

(58) Field of Classification Search .............. 235/61 R, 235/63 A, 65, 66, 74, 73, 77, 83, 70 C, 70 A, 235/78 R, 61 A, 475, 78 A, 78 N, 78 M, 235/70 R, 79.5, 61 GM, 78 G, 58 R, 78 RC; D18/5, 9, 10–12, 126, 129, 71, 79; D10/46, D10/122; 283/56; 33/15, 17, 512

See application file for complete search history.

(56) References Cited

U.S. PATENT DOCUMENTS 1,056,775 A 3/1913 Brunton ....................... 235/84
2,563,110 A * 8/1951 Grundlehner ............. 235/78 A
D176,657 S 1/1956 Dreyfuss ..................... D10/51
3,215,344 A 11/1965 Joffe ..................... 235/78 RC
3,259,311 A * 7/1966 Sama et al. ............... 235/78 A
3,275,235 A * 9/1966 Balch .......................... 235/84
3,309,017 A 3/1967 Koskela .................... 235/78 R
3,556,397 A * 1/1971 Andersen et al. ...... 235/61 GM
D221,185 S * 7/1971 Gluck ......................... D18/10
3,654,436 A * 4/1972 Sansom, Jr. .............. 235/78 R
3,701,471 A * 10/1972 Kurland .................... 235/78 G
3,747,846 A * 7/1973 Long ........................... 235/84
3,757,092 A * 9/1973 Miller ......................... 235/74
3,778,766 A * 12/1973 Rapp .......................... 714/807
3,795,795 A * 3/1974 Gulbransen, Jr. ......... 235/70 A
3,862,398 A * 1/1975 Toscan .................. 235/61 NV
4,026,463 A * 5/1977 Betzler ..................... 235/88 R
4,048,477 A * 9/1977 Hungerford ............... 235/88 R
D254,052 S 1/1980 Wolfe .......................... D10/51
4,317,404 A * 3/1982 Lombardo ................... 84/474
4,323,609 A * 4/1982 Bromberg .................. 428/66.6
4,329,570 A 5/1982 Koll ......................... 235/78 R
4,346,288 A * 8/1982 Foster ...................... 235/70 A
D277,108 S 1/1985 Lundquist .................... D18/10

(Continued)

*Primary Examiner*—Karl D. Frech
*Assistant Examiner*—Daniel Walsh
(74) *Attorney, Agent, or Firm*—Myers Bigel Sibley & Sajovec

(57) ABSTRACT

An apparatus for determining a characteristic, such as body mass index number, for a person includes a housing having a panel with an edge portion, an intermediate portion, and a window formed in the intermediate portion. A member is movably secured to the housing and a peripheral portion of the member extends from the housing adjacent the panel edge portion. Indicia that indicates incremental units of a first characteristic is disposed on either the panel edge portion or the member peripheral portion. Indicia that indicates incremental units of a second characteristic is disposed on the other one of the panel edge portion or the member peripheral portion. Indicia that indicates incremental units of a third characteristic is disposed on the member and is viewable through the window. Movement of the member to align first indicia units with second indicia units causes display of third indicia units via the window.

21 Claims, 4 Drawing Sheets

U.S. PATENT DOCUMENTS

| | | | | | |
|---|---|---|---|---|---|
| 4,599,508 | A | * | 7/1986 | Smetaniuk | 235/116 |
| D289,905 | S | * | 5/1987 | Goldring | D19/25 |
| 4,920,033 | A | * | 4/1990 | Cress | 434/198 |
| 5,310,994 | A | * | 5/1994 | Thabet et al. | 235/77 |
| D349,919 | S | | 8/1994 | Tunstall-Pedoe | D18/10 |
| 5,481,093 | A | * | 1/1996 | Rogerson | 235/78 R |
| 5,517,007 | A | * | 5/1996 | Morgan | 235/70 A |
| 5,553,387 | A | * | 9/1996 | Newcomb | 33/1 SD |
| 5,691,523 | A | * | 11/1997 | Calvo | 235/78 R |
| D390,482 | S | | 2/1998 | Pasquarette | D10/50 |
| 5,717,193 | A | * | 2/1998 | Marcelo | 235/69 |
| D401,613 | S | | 11/1998 | Goldman | D18/10 |
| 6,135,348 | A | * | 10/2000 | Hayes | 235/78 R |
| 6,265,651 | B1 | * | 7/2001 | Landtroop | 84/471 R |
| 6,311,403 | B1 | * | 11/2001 | Macrini | 33/1 SD |
| 6,450,538 | B2 | * | 9/2002 | Errard | 283/72 |
| 6,460,762 | B1 | * | 10/2002 | Bromberg et al. | 235/78 R |
| 6,488,202 | B1 | * | 12/2002 | Seitz et al. | 235/78 R |
| 6,569,040 | B2 | * | 5/2003 | Bradstock | 473/407 |
| 6,648,219 | B1 | * | 11/2003 | Daunell | 235/78 R |
| D493,190 | S | * | 7/2004 | Holland | D18/10 |
| 6,789,728 | B1 | * | 9/2004 | Muzzammel | 235/85 FC |
| D501,871 | S | * | 2/2005 | Holland | D18/10 |
| 2004/0169070 | A1 | * | 9/2004 | Bromberg et al. | 235/78 R |

* cited by examiner

PROMOTIONAL APPARATUS FOR CALCULATING CHARACTERISTICS OF SUBJECTS USING TWO INPUT VARIABLES

FIELD OF THE INVENTION

The present invention relates generally to product and service promotion and, more particularly, to the promotion of healthcare-related products and services.

BACKGROUND OF THE INVENTION

The use of promotional items has proliferated in today's increasingly competitive marketplace, where companies are constantly seeking new and more effective ways to market their products and services. In the healthcare industry, physicians and other healthcare providers often receive promotional articles from vendors of healthcare-related products, such as pharmaceutical products. These promotional articles often include "everyday" items, such as writing pads, calendars, and pens, and typically have promotional information (indicia) printed thereon. For example, pharmaceutical companies often provide physicians with writing pens and pads having the name of a particular pharmaceutical product printed thereon with the hopes that the pens and pads, when used, will help remind physicians to prescribe the pharmaceutical product.

Unfortunately, often because of lack of distinctiveness, many promotional articles provided to healthcare providers become "lost-in-the-shuffle" with other promotional articles. Thus, there is a need for distinctive, more effective promotional products directed to physicians and other healthcare providers.

SUMMARY OF THE INVENTION

In view of the above discussion, a promotional apparatus for use in determining a characteristic of a person or other subject, such as a body mass index number, according to embodiments of the present invention, includes a housing having a panel with an edge portion, an intermediate portion, and a window formed in the intermediate portion. A member is movably secured to the housing such that a peripheral portion of the member extends from the housing adjacent the panel edge portion as the member is moved relative to the housing. Indicia that indicates incremental units of a first characteristic is disposed on either the panel edge portion or the member peripheral portion. Indicia that indicates incremental units of a second characteristic is disposed on the other one of the panel edge portion or the member peripheral portion. For example, if the apparatus is used to determine body mass index numbers for a person, indicia that indicates units of incremental weight is disposed on either the panel edge portion or the member peripheral portion. Indicia that indicates units of incremental height is disposed on the other one of the panel edge portion or the member peripheral portion.

The panel edge portion and member are configured such that the indicia of the respective first and second characteristics maintain an adjacent relationship as the member is moved relative to the housing by a user. Indicia that indicates incremental units of a third characteristic is disposed on the member and is viewable through the window. Movement of the member by a user to align an incremental first indicia unit with an incremental second indicia unit causes display of a third indicia unit via the window. For example, in the body mass index embodiment, movement of the member by a user to align an incremental weight indicia with an incremental height indicia causes display of a body mass index number via the window.

According to other embodiments of the present invention, a promotional apparatus includes a clam-shell housing having opposite, spaced-apart first and second panels. The first panel includes an arcuate edge portion, an intermediate portion, and a window formed in the intermediate portion. A wheel is disposed between the first and second panels and is rotatably secured to the housing such that a peripheral portion of the wheel extends from the housing adjacent the first panel arcuate edge portion. Indicia that indicates incremental units of a first characteristic (e.g., weight, etc.) is disposed on either the wheel peripheral portion or the first panel arcuate edge portion. Indicia that indicates incremental units of a second characteristic (e.g., height, etc.) is disposed on the other one of the first panel arcuate edge portion or wheel peripheral edge portion. The wheel is rotatably secured to the housing such that the first and second respective indicia maintain an adjacent relationship as the wheel is rotated relative to the housing by a user. Indicia that indicates incremental units of a third characteristic (e.g., body mass index numbers, etc.) is disposed on the wheel and is viewable through the window. Rotation of the wheel by a user to align an incremental first indicia unit (e.g., height, etc.) with an incremental second indicia unit (e.g., weight, etc.) causes the display of a third indicia unit (e.g., body mass index number, etc.) via the window.

Embodiments of the present invention can serve as promotional devices directed to the marketing of various pharmaceuticals and healthcare products and services, as well as various other products and services. For example, promotional indicia directed to weight loss products and services may be displayed on embodiments of the present invention.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
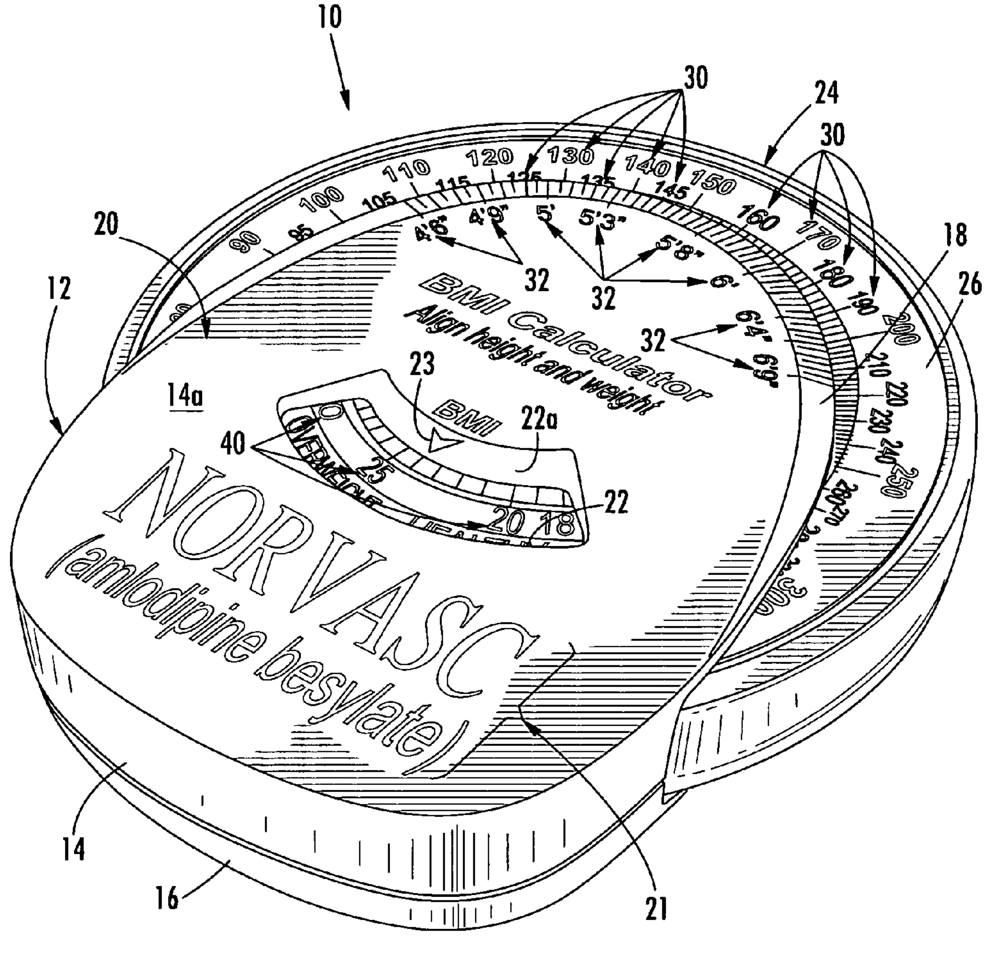
FIG. 1 is a perspective view of a promotional apparatus, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

The terms "upwardly", "downwardly", "vertical", "horizontal" and the like are used herein for the purpose of explanation only.

As used herein, the term "and/or" includes any and all combinations of one or more of the associated listed items.

In the illustrated embodiments, the promotional apparatus described below is directed to a body mass index calculator. However, embodiments of the present invention are not limited to body mass index calculators. Embodiments of the present invention may be utilized to calculate any characteristic based on the alignment of adjacent scales of two variables. In addition to height and weight, other exemplary scales may include, but are not limited to, age, time, gestation periods, blood pressure, pulse rate, cholesterol, and various other vital signs and measurements of characteristics of a subject, without limitation.

Figure 2:
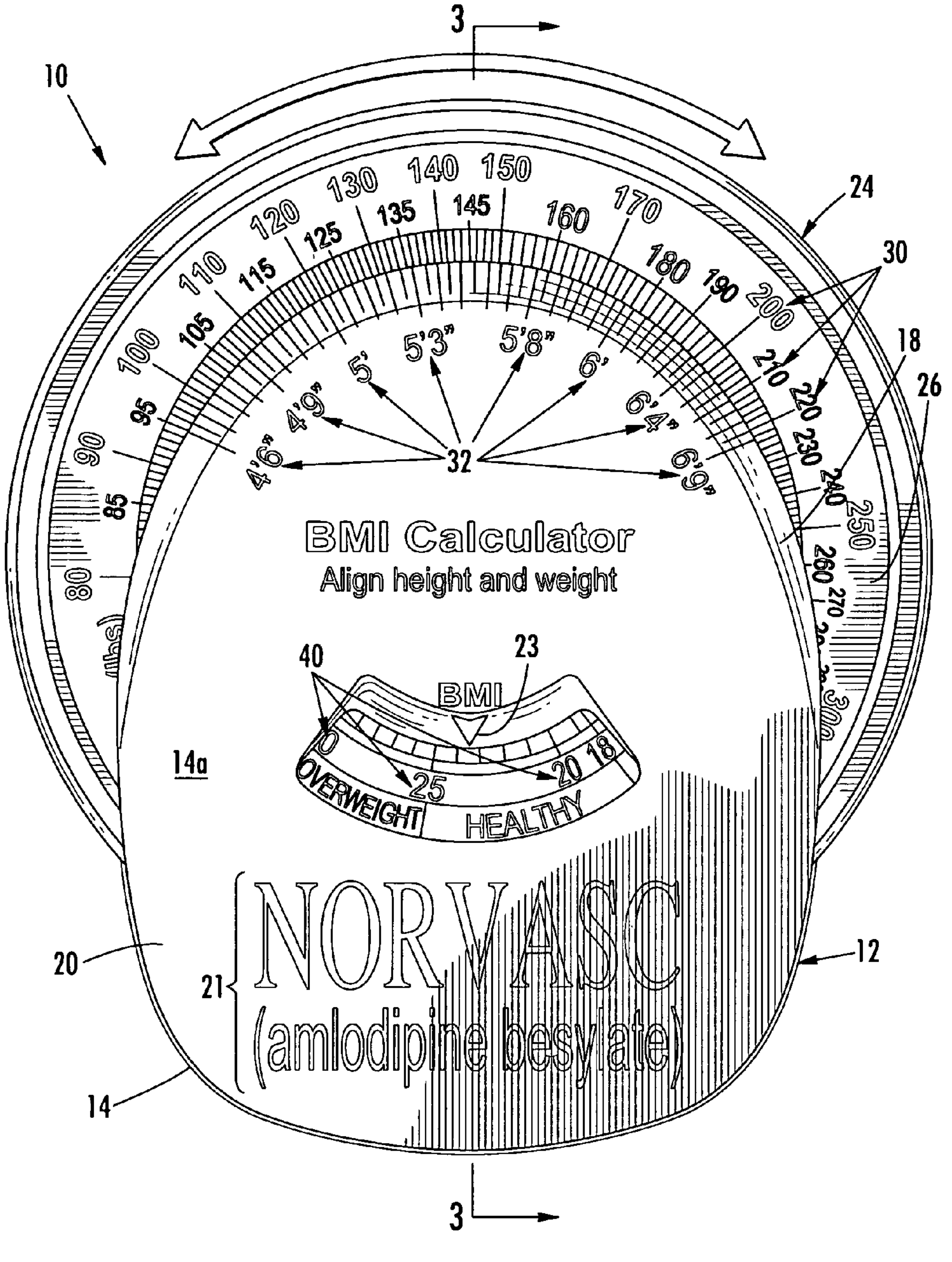
FIG. 2 is a front plan view of the promotional apparatus of FIG. 1.

Referring now to FIGS. 1–2, a promotional apparatus 10 that can be used to calculate a body mass index number for a person, according to embodiments of the present invention, is illustrated. The illustrated apparatus 10 includes a clam-shell housing 12 having opposite, spaced-apart first and second panels 14, 16. The first panel 14 includes an arcuate edge portion 18, an intermediate portion 20, and a window 22 formed in the intermediate portion 20, as illustrated. A wheel 24 is disposed between the first and second panels 14, 16 and is rotatably secured to the housing 12 such that a peripheral portion 26 of the wheel 24 extends from the housing adjacent the first panel arcuate edge portion 18, as illustrated.

The illustrated first panel 14 has a generally ovate shape with a generally planar surface 14*a*. Also, the panel arcuate edge portion 18 has a beveled configuration. However, embodiments of the present invention are not limited to the illustrated configuration of the housing 12 and first panel 14. The first panel 14 may have various shapes and the surface 14*a* (or portions thereof) may have non-planar configurations.

Promotional indicia 21 is disposed on the first panel 14, as illustrated. Various types of promotional indicia including, but not limited to, lettering, designs, characters, logos and other symbols, may be utilized in accordance with embodiments of the present invention. The term "lettering" as used herein includes, but is not limited to, alphabetical characters and alphanumeric characters. Moreover, promotional indicia may be utilized virtually anywhere on the housing 12 and the wheel 24. Embodiments of the present invention are not limited to the illustrated location and configuration of indicia 21.

The window 22 formed in the first panel 14 has an arcuate configuration in the illustrated embodiment. In addition, an edge portion 22*a* of the window 22 has a beveled configuration. However, window 22 may have various shapes, sizes and configurations according to embodiments of the present invention. In the illustrated embodiment, an arrow 23 is disposed on the window edge portion 22*a* and is used to facilitate indication of a body mass index number displayed via the window 22, as will be described below.

In the illustrated embodiment, indicia 30 that indicates units of incremental weight is disposed on the wheel peripheral portion 26, and indicia 32 that indicates units of incremental height is disposed on the first panel arcuate edge portion 18. However, weight indicia 30 and height indicia 32 may be reversed according to other embodiments of the present invention. That is, weight indicia 30 may be disposed on the first panel arcuate edge portion 18, and height indicia 32 may be disposed on the wheel peripheral portion 26. The wheel 24 is rotatably secured to the housing such that the incremental weight indicia 30 and incremental height indicia 32 maintain an adjacent relationship as the wheel is rotated relative to the housing by a user.

In the illustrated embodiment, the portion of the panel arcuate edge portion 18 displaying the height indicia 32 and the wheel 24 have substantially the same radius of curvature. This allows the weight indicia 30 and height indicia 32 to maintain the illustrated adjacent relationship as the wheel 24 is rotated relative to the housing 12 by a user.

Indicia 40 that indicates incremental body mass index numbers is disposed on the wheel 24 and is viewable through the window 22, as illustrated. Rotation of the wheel 24 by a user to align a particular weight (indicia 30) with a particular height (indicia 32) causes the display of a body mass index number via the window 22. For example, in the illustrated embodiment, a user has aligned a weight of 120 lbs (indicia 30) with a height of 5' (indicia 32) and the body mass index number 23.5 is displayed via window 22.

Figure 3:
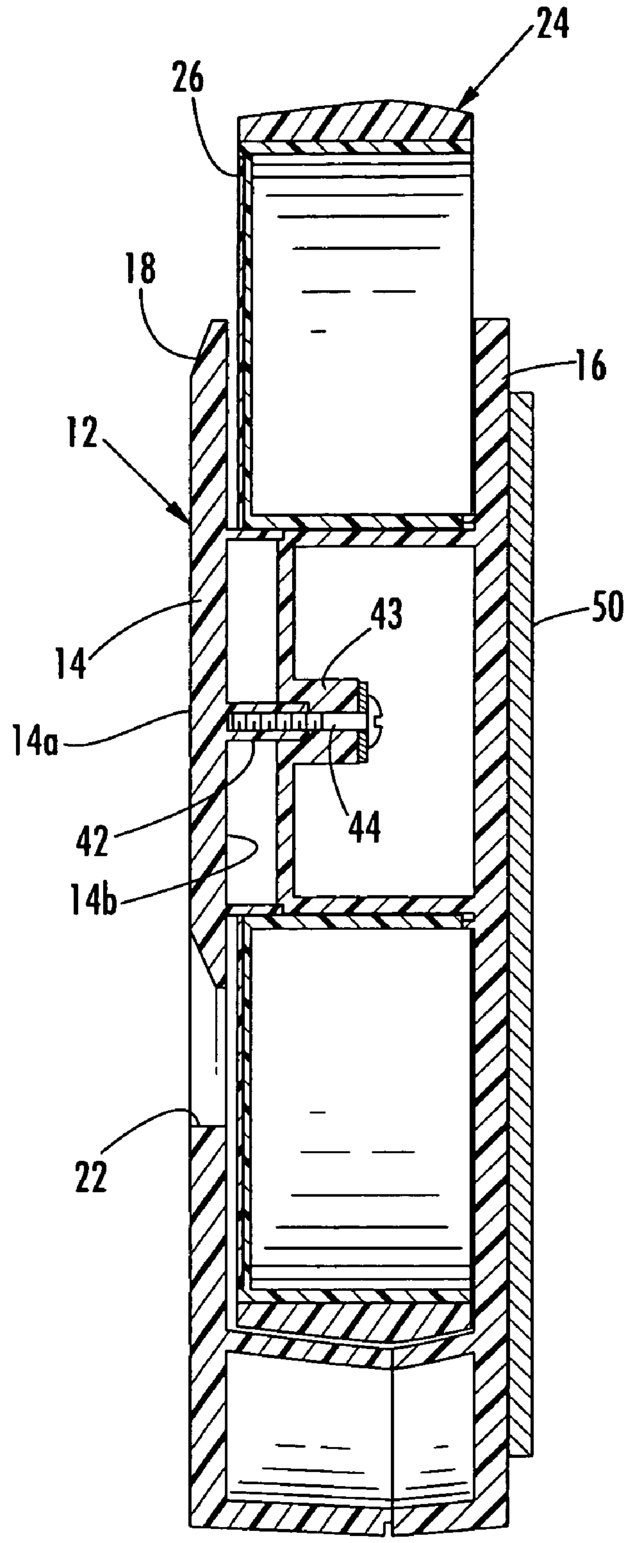
FIG. 3 is cross-sectional view of the promotional apparatus of FIG. 2 taken along lines 3—3.

Referring to FIG. 3, a threaded post 42 extends outwardly from surface 14*b* of the first panel 14, as illustrated. Wheel 24 includes a journal portion 43 adapted to engage post 42 and rotate about post 42, as illustrated. A threaded member 44 (e.g., a screw, bolt, etc.) extends through the journal portion 43 and threadingly engages the threaded post 42 to maintain the journal portion 43 and post 42 in engagement. As would be understood by those skilled in the art, the wheel 24 can be rotationally secured to the housing 12 in any number of ways. Embodiments of the present invention are not limited to the illustrated configuration.

Still referring to FIG. 3, a magnet 50 is attached to the housing second panel 16 and is configured to magnetically secure the apparatus to a surface of iron or steel, such as the surface of a weight scale, the surface of a refrigerator, etc. When magnetically secured to a surface, the apparatus 10 can be easily operated with one hand by a user. Moreover, the magnet 50 allows the apparatus 10 to be easily positioned at any height (e.g., eye level) for a user. Embodiments of the present invention are not limited to the use of a magnet to secure the apparatus 10 to a surface. Various methods of securing the apparatus 10 to a surface including, but not limited to, adhesives, hook and loop fasteners, etc., may be utilized.

Figure 4:
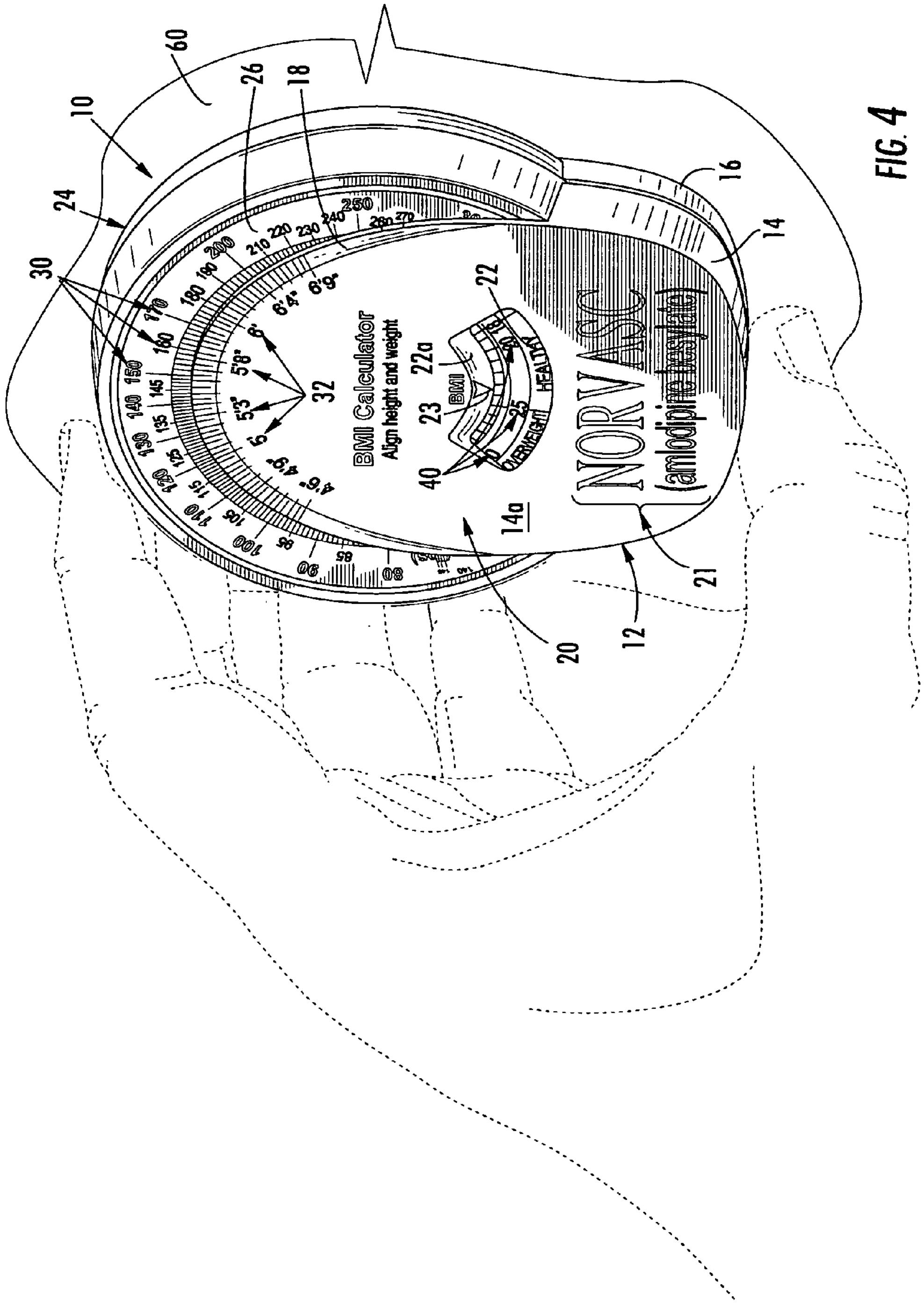
FIG. 4 is a perspective view of the promotional apparatus of FIG. 1 attached to a wall and illustrating one-handed operation by a user.

Referring to FIG. 4, the apparatus 10 is illustrated being secured to a wall 60 (or other generally vertical surface). When attached to a wall, a user can easily rotate the wheel 24 relative to housing 12 with one hand.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An apparatus, comprising:

a housing comprising a panel with an edge portion, an intermediate portion, and a window formed in the intermediate portion;

a member movably secured to the housing such that a peripheral portion of the member extends from the housing adjacent the panel edge portion as the member is moved relative to the housing;

indicia indicating incremental units of a first characteristic disposed on one of the panel edge portion or the member peripheral portion, and indicia indicating incremental units of a second characteristic disposed on the other one of the panel edge portion or the member peripheral portion, wherein the indicia of the respective first and second characteristics maintain an adjacent relationship as the member is moved relative to the housing by a user; and indicia indicating incremental units of a third characteristic disposed on the member and viewable through the window, wherein movement of the member by a user to align an incremental first indicia unit with an incremental second indicia unit causes display of a third indicia unit via the window.

2. The apparatus of claim 1, wherein the housing comprises opposite, spaced-apart first and second panels that define a slot, and wherein the member is movably disposed within the slot.

3. The apparatus of claim 1, wherein the housing panel comprises promotional indicia thereon.

4. The apparatus of claim 1, wherein the housing further comprises a magnet that is configured to magnetically secure the apparatus to a surface.

5. The apparatus of claim 1, wherein the housing further comprises adhesive that is configured to secure the apparatus to a surface.

6. The apparatus of claim 1, wherein the indicia indicating incremental units of a first characteristic comprise indicia indicating units of incremental weight, wherein the indicia indicating incremental units of a second characteristic comprise indicia indicating units of incremental height, and wherein the indicia indicating incremental units of a third characteristic comprise indicia indicating incremental body mass index numbers.

7. An apparatus, comprising:

a housing comprising a panel with an arcuate edge portion, an intermediate portion, and a window formed in the intermediate portion;

a wheel rotatably secured to the housing such that a peripheral portion of the wheel extends from the housing adjacent the panel arcuate edge portion;

indicia indicating incremental units of a first characteristic disposed on one of the panel arcuate edge portion or the wheel peripheral portion, and indicia indicating incremental units of a second characteristic disposed on the other one of the panel arcuate edge portion or the wheel peripheral portion, wherein the indicia of the respective first and second characteristics maintain an adjacent relationship as the wheel is rotated relative to the housing by a user; and indicia indicating incremental units of a third characteristic disposed on the wheel and viewable through the window, wherein rotation of the wheel by a user to align an incremental first indicia unit with an incremental second indicia unit causes display of a third indicia unit via the window.

8. The apparatus of claim 7, wherein the housing comprises opposite, spaced-apart first and second panels that define a slot, and wherein the wheel is disposed within the slot.

9. The apparatus of claim 7, wherein the panel arcuate edge portion and the wheel have substantially the same radius of curvature.

10. The apparatus of claim 7, wherein the panel arcuate edge portion has a beveled configuration.

11. The apparatus of claim 7, wherein the housing panel comprises promotional indicia thereon.

12. The apparatus of claim 7, wherein the housing further comprises a magnet that is configured to magnetically secure the apparatus to a surface.

13. The apparatus of claim 7, wherein the housing further comprises adhesive that is configured to secure the apparatus to a surface.

14. The apparatus of claim 7, wherein the window has an arcuate configuration.

15. The apparatus of claim 7, wherein the indicia indicating incremental units of a first characteristic comprise indicia indicating units of incremental weight, wherein the indicia indicating incremental units of a second characteristic comprise indicia indicating units of incremental height, and wherein the indicia indicating incremental units of a third characteristic comprise indicia indicating incremental body mass index numbers.

16. An apparatus, comprising:

a housing comprising opposite, spaced-apart first and second panels, wherein the first panel comprises an arcuate edge portion, an intermediate portion, and a window formed in the intermediate portion;

a wheel disposed between the first and second panels and rotatably secured to the housing such that a peripheral portion of the wheel extends from the housing adjacent the first panel arcuate edge portion;

indicia indicating incremental units of a first characteristic disposed on one of the first panel arcuate edge portion or the wheel peripheral portion, and indicia indicating incremental units of a second characteristic disposed on the other one of the first panel arcuate edge portion or the wheel peripheral portion, wherein the indicia of the respective first and second characteristics maintain an adjacent relationship as the wheel is rotated relative to the housing by a user;

indicia indicating incremental units of a third characteristic disposed on the wheel and viewable through the window, wherein rotation of the wheel by a user to align an incremental first indicia unit with an incremental second indicia unit causes display of a third indicia unit via the window; and a magnet attached to the housing second panel that is configured to magnetically secure the apparatus to a surface.

17. The apparatus of claim 16, wherein the housing first panel comprises promotional indicia thereon.

18. The apparatus of claim 16, wherein the window has an arcuate configuration.

19. The apparatus of claim 16, wherein the panel arcuate edge portion and the wheel have substantially the same radius of curvature.

20. The apparatus of claim 16, wherein the panel arcuate edge portion has a beveled configuration.

21. The apparatus of claim 16, wherein the indicia indicating incremental units of a first characteristic comprise indicia indicating units of incremental weight, wherein the indicia indicating incremental units of a second characteristic comprise indicia indicating units of incremental height, and wherein the indicia indicating incremental units of a third characteristic comprise indicia indicating incremental body mass index numbers.

* * * * *